US009735453B2

(12) United States Patent
Manev et al.

(10) Patent No.: US 9,735,453 B2
(45) Date of Patent: Aug. 15, 2017

(54) LITHIUM ION CELL PREPARATION BY ADJUSTING NEGATIVE AND POSITIVE ELECTRODES

(71) Applicant: Altairnano, Inc., Reno, NV (US)

(72) Inventors: Veselin Manev, Reno, NV (US); John Shelbourne, Lakeland, FL (US); Paul Royer, Richmond, IN (US); Mike Coleman, Reno, NV (US)

(73) Assignee: ALTAIRNANO, Inc., Reno, NV (US)

( * ) Notice: Subject to any disclaimer, the term of this patent is extended or adjusted under 35 U.S.C. 154(b) by 658 days.

(21) Appl. No.: 13/847,696

(22) Filed: Mar. 20, 2013

(65) Prior Publication Data

US 2013/0252036 A1    Sep. 26, 2013

Related U.S. Application Data

(60) Provisional application No. 61/685,547, filed on Mar. 21, 2012.

(51) Int. Cl.
| | |
|---|---|
| *H01M 10/52* | (2006.01) |
| *H01M 10/0525* | (2010.01) |
| *H01M 10/058* | (2010.01) |
| *H01M 10/44* | (2006.01) |
| *H01M 4/485* | (2010.01) |

(52) U.S. Cl.
CPC ........ *H01M 10/52* (2013.01); *H01M 10/058* (2013.01); *H01M 10/0525* (2013.01); *H01M 10/446* (2013.01); *H01M 4/485* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | | | |
|---|---|---|---|---|
| 6,329,096 B2 * | 12/2001 | Kawakami | ...................... | 429/49 |
| 2012/0320497 A1 * | 12/2012 | Ehrenberg | ............ | H01G 11/56 361/525 |

* cited by examiner

*Primary Examiner* — Ula C Ruddock
*Assistant Examiner* — Tony Chuo
(74) *Attorney, Agent, or Firm* — Yudell Isidore PLLC

(57) ABSTRACT

The invention relate to methods of preparing lithium ion cells including cells using $Li_4Ti_5O_{12}$ as negative electrode material and layered transition metal oxides as positive electrode material or composite positive electrode wherein one of the components is layered transition metal oxide in which the amount of moisture in the cell is reduced such that the characteristics of the cell such as cycle life and cell impedence are improved.

18 Claims, 4 Drawing Sheets

LITHIUM ION CELL PREPARATION BY ADJUSTING NEGATIVE AND POSITIVE ELECTRODES

RELATED U.S. APPLICATION DATA

This application claims priority to U.S. Provisional Application No. 61/685,547 filed Mar. 21, 2012.

FIELD OF THE INVENTION

The invention relates to methods of preparing lithium ion cells including cells using Li4Ti5O12 as negative electrode material and layered transition metal oxides as positive electrode material or composite positive electrode in which one of the components is layered transition metal oxide in which the amount of moisture in the cell is reduced such that the characteristics of the cell such as cycle life and cell impedance are improved.

BACKGROUND OF THE INVENTION

Rechargeable lithium ion batteries need to be stable and have a long cycle life. Traditional lithium ion batteries that use carbon as an anode have a cycle life which typically ranges from 500-1000 cycles. Lithium ion batteries that use lithium titanate as anode material (negative electrode) have been shown to exhibit cycle life in excess of 15,000 cycles.

Degradation of the electro-active material from reactions with electrolyte in a rechargeable cell over the course of time leads to diminished cell performance. The objective in the 'formation step' in cell manufacturing is to build passive protective layers over the electroactive materials which are designed to minimize impedance in cell operation while providing structural integrity of the electroactive material from attack by the electrolyte over time with cycling.

In the case of carbon anodes, this formation step involves the activated cell undergoing specific patterns of applied voltage, temperature and time conditions in a step-wise manner (formation profile) so that a customized protective Solid Electrolyte Interface (SEI) layer is grown.

In the case of cells with lithium titanate anodes, the SEI layer is built over the cathode electroactive material (positive electrode) and is generated by unique specific conditions of voltage, temperature and time. The synthesis of these special layers through a specific formation profile leads to the growth of the SEI layer on the cathode.

Byproducts, such as gases, are formed as a result of the reaction delineated in the formation profile. Special processing techniques have to be used in the execution of the formation profile conditions to eliminate these by products from the packaged cell.

The presence of the water in traces amounts in lithium ion cells may have strong detrimental effects on cycle and calendar life of the cell. Moisture in the cell can decrease capacity retention, increase cell impedance and cause intensive cell gassing. Water can be introduced into the cell system in a variety of ways. Some water may be contained within the components of the cell. Some water may be introduced during processing. Some water may actually be formed as a result of reactions taking place with available protons and hydroxyl radicals. Steps can be taken to reduce, control and eliminate the water content within the final sealed cell components so as to increasing cycle life and cell performance Advances in Lithium Ion Batteries, Edited by Walter van Schakwijk and Bruno Scrosati, Table 1, p. 20-21 and p. 163, T. Kawamura et al., Journal of Power Sources 156 (2006) 547-554 and T. Kawamura et al., Extended Abstracts of 41 Battery Symposiums in Japan, p. 280, 2000.

There is a need to extend the useful life of electrodes in a rechargeable lithium ion cell by using improved formation conditions and protocols that can significantly decrease or completely eliminate the moisture content in the cell. The present invention provides methods for decreasing or eliminating water within the system after cell activation.

SUMMARY OF THE INVENTION

The present invention relates to methods of preparing a lithium ion battery having a negative electrode, a positive electrode and electrolyte solution in which the potential of the negative electrode is adjusted such that it is more negative than the potential causing reduction of hydrogen ions in cell electrolyte solution to hydrogen molecules after which the potential of the positive electrode is adjusted such that it is more negative than the potential causing extraction of hydrogen ions in the positive electrode material. These steps of adjusting the relative potentials can then be followed by degassing the cell.

DETAILED DESCRIPTION OF THE INVENTION

Figure 1:
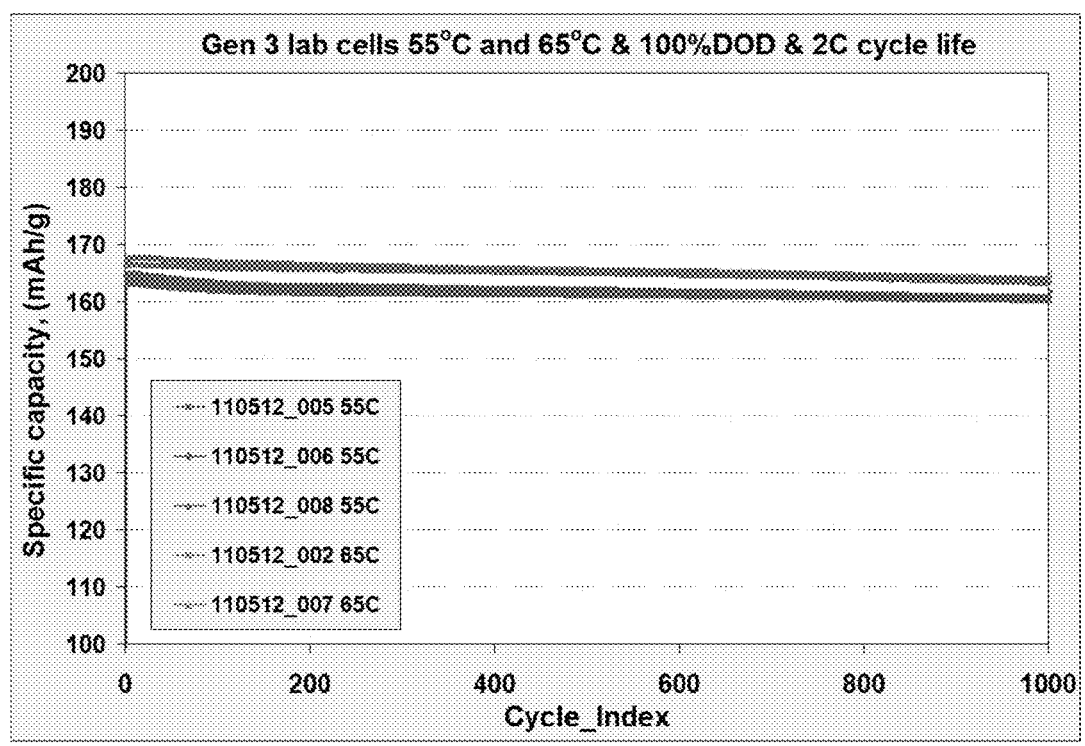
FIG. 1. Capacity retention during cycling at 2C/2C constant current charge/discharge rate and 100% DOD at 55° C. and 65° C. of $Li_4Ti_5O_{12}/LiNi_{0.33}Co_{0.33}Mn_{0.33}O_2$ cells.

In the present invention, the formation protocol targets protons present in the cathode and the electrolyte and removes them from the system so that they are not available for water formation that can deteriorate a sealed cell. A series of sequential steps in the formation protocol provides that protons in the cathode material are (through use of appropriate potentials) moved into the electrolyte and the protons present in the electrolyte are subsequently reduced to hydrogen molecules which then are subsequently degassed from the cell prior to sealing. The methods utilizing the formation procedure for preparation of lithium ion battery with $Li_4Ti_5O_{12}$ compound as negative electrode material and layered transition metal oxide as positive electrode material significantly improve cell capacity retention and cell impedance retention during cycle life and calendar life tests at room and elevated temperatures and suppress cell gassing at elevated temperature as demonstrated in FIGS. 1-3.

This invention is related to methods for preparation of a lithium ion cell using, for example, $Li_4Ti_5O_{12}$ as negative electrode material and a layered transition metal oxide as positive electrode material or composite positive electrode where at least one of the components is layered transition metal oxide. The composite positive electrode may comprise at least one layered transition metal oxide material as a component of electrode mixture or to be part of a solid solution of two or more phases or a combination thereof.

The methods according to the invention provide for cell formation utilizing multiple steps. The steps may be applied consecutively as a two-step procedure where the first step provides that the potential of negative electrode (e.g. LTO electrode) is kept significantly more negative than the potential that can cause reduction of the existing hydrogen ions in cell electrolyte solution to hydrogen molecules. This first step is followed by a second step where the potential of positive electrode is kept significantly more negative than the potential that cause extraction of the existing hydrogen ions in the positive electrode (e.g. layered transition metal oxide) and transfer them to the electrolyte solution. The first step and the second step may be performed in a pairwise fashion such that the second step succeeds the first step. The first and second steps may be repeated two or more times in sequential order. The first and second steps may be repeated in sequential order two, three, four, five or more times. After applying the sequential steps the cell may be degassed such that all the reduced hydrogen ions from the electrolyte and positive electrode material which have been converted to hydrogen molecules are removed from the cell. This step typically involves the application of vacuum to the seal, which removes generated gases, followed by hermetic sealing or resealing of the electrochemical cell.

The method of the present invention include preparing a lithium ion battery comprising a negative electrode, a positive electrode and electrolyte solution where the potential of the negative electrode is adjusted such that hydrogen ions in electrolyte solution are reduced to hydrogen molecules, followed by adjusting the potential of the positive electrode such that hydrogen ions in the positive electrode material are extracted and then the potential of the negative electrode is again adjusted such that hydrogen ions in electrolyte solution are reduced to hydrogen molecules and then the cell is degassed. These steps may be repeated one or more times.

According to the invention the described multiple steps cell formation procedure may be performed at an elevated temperature in the temperature range, preferably from about 75° C.-110° C. The duration of each of the steps may vary and may be selected depending of cell design and format to be as fast as possible but not to cause overheating of cell because of use of very high charge-discharge rate during the change in electrodes potentials.

The steps of the present method where the potentials of the electrodes are adjusted may be performed from about 50° C. to about 150° C. or from about 60° C. to about 140° C. or from about 70° C. to about 130° C. or from about 75° C. to about 110° C. or from about 80° C. to about 100° C. or from about 90° C. to about 100° C. or from about 72° C. to about 105° C. or from about 75° C. to about 100° C.

The steps of the present method where the potentials of the electrodes are adjusted may be performed for a duration from about 0.1 hours to about 24 hours or from about 0.2 hours to about 20 hours or from about 0.3 hours to about 15 hours or from about 0.4 hours to about 10 hours or from about 0.5 hours to about 5 hours or from about 1.0 hours to about 5 hours or from about 2 hours to 5 hours or from about 3 hours to about 5 hours.

The step of the present method where the potentials of the negative electrode is adjusted may be between about 0.1V to about 4.0V or from about 0.5V to about 5.0V or from about 1.0V to about 5.0V or from about 1.0V to about 4.0V or from about 2.0V to about 4.5V or from about 2.0V to about 4.0V or from about 2.5V to about 4.0V or from about 2.4V to about 3.2V or from about 1.2V to about 1.5V versus that of the lithium reference electrode.

The step of the present method where the potentials of the positive electrode is adjusted may be between about 0.1V to about 4.0V or from about 0.5V to about 3.0V or from about 0.5V to about 2.0V or from about 1.0V to about 2.0V or from about 1.0V to about 1.5V or from about versus that of the lithium reference electrode.

The change of the electrode potentials between adjusting the potential of the negative electrode such that it is more negative than the potential causing reduction of hydrogen ions in cell electrolyte solution to hydrogen molecules and adjusting the potential of the positive electrode such that it is more negative than the potential causing extraction of hydrogen ions in the positive electrode material may be performed using charge/discharge rate between about a 1C and about a 10C rate or about a 1C and about a 8C rate or about a 1C and about a 5C rate or about a 2C and about a 10C rate or about a 3C and about a 10C rate or about a 4C rate and about a 10C rate or about a 5C and about a 10C rate or about a 6C and about a 8C rate.

In the methods of the present invention, the formation protocol targets protons in any possible form, including protons formed from the water in the cell, and by converting them to hydrogen molecules removes them from the system during the degassing step. Depending on the number of steps performed during the formation procedure and temperature at which these steps are performed the water content in the cell may be reduced by a factor of between from about 2 fold to 10000 fold or from about 2 fold to 10000 fold or from about 2 fold to 10000 fold or from about 5 fold to 10000 fold or from about 10 fold to 10000 fold or from about 50 fold to 10000 fold or from about 2 fold to 1000 fold or from about 5 fold to 1000 fold or from about 10 fold to 1000 fold or from about 20 fold to 1000 fold or from about 50 fold to 1000 fold or from about 100 fold to 1000 fold or from about 2 fold to 500 fold or from about 5 fold to 500 fold or from about 10 fold to 500 fold or from about 20 fold to 500 fold or from about 50 fold to 500 fold or from about 100 fold to 500 fold. As a result the formation protocol according to the present invention more than about 5% or about 10% or more than about 25% or more than about 50% or more than about 75% or more than about 90% or more than about 99% or more than about 99.9% or more than about 99.99% of the preliminary existing water in the system is removed. The methods of the present invention remove from about 5% to 99.9% or from about 10% to 99.9% or from about 20% to 99.9% or from about 30% to 99.9% or from about 40% to 99.9% or from about 50% to 99.9% or from about 60% to 99.9% or from about 70% to 99.9% or from about 80% to 99.9% or from about 90% to 99.9% or from about 5% to 75% or from about 10% to 75% or from about 25% to 75% or from about 50% to 75% or from about 5% to 50% or from about 10% to 50% or from about 15% to 50% or from about 20% to 50% or from about 25% to 50% or from about 30% to 50% or from about 35% to 50% or from about 40% to 50% or from about 95% to 99.99% or from about 98% to 99.99% or from about 99% to 99.99%. The methods of the present invention provide a cell with water content in the cell electrolyte in the range of several ppm (See example 5). For example, the methods of the present invention provide electrolytes in the cell with a water content of less than about 100 ppm or less than about 90 ppm or less than about 80 ppm or less than about 70 ppm or less than about 60 ppm or less than about 50 ppm or less than about 40 ppm or less than about 30 ppm or less than about 20 ppm or less than about 10 ppm or less than about 5 ppm or less than about 3 ppm or less than about 2 ppm or less than about 1 ppm or less than about 0.5 ppm or less than about 0.2 ppm or less than about 0.1 ppm. The methods of the present invention provide electrolytes in the cell with a water content of between about 0.1 to about 100 ppm, or from about 0.1 to about 75 ppm or from about 0.1 to about 50 ppm or from about 0.1 to about 25 ppm or from about 0.1 to about 15 ppm or from about 0.1 to about 10 ppm or from about 0.1 ppm to about 8 ppm or from about 0.1 to about 5 ppm or from about 0.1 to about 4 ppm or from about 0.1 to about 3 ppm or from about 0.1 to about 2 ppm or from about 0.1 to about 1 ppm or from about 0.1 to about 0.5 ppm or 0.5 to about 100 ppm, or from about 0.5 to about 75 ppm or from about 0.5 to about 50 ppm or from about 0.5 to about 25 ppm or from about 0.5 to about 15 ppm or from about 0.5 to about 10 ppm or from about 0.5 ppm to about 8 ppm or from about 0.5 to about 5 ppm or from about 0.5 to about 4 ppm or from about 0.5 to about 3 ppm or from about 0.5 to about 2 ppm or from about 0.5 to about 1 ppm or from about 1 to about 100 ppm or 1 to about 75 ppm or from about 1 to about 50 ppm or from about 1 to about 25 ppm or from about 1 to about 15 ppm or from about 1 to about 10 ppm or from about 1 ppm to about 8 ppm or from about 1 to about 5 ppm or from about 1 to about 4 ppm or from about 1 to about 3 ppm or from about 1 to about 2 ppm or 2 to about 100 ppm, or from about 2 to about 75 ppm or from about 2 to about 50 ppm or from about 2 to about 25 ppm or from about 2 to about 15 ppm or from about 2 to about 10 ppm or from about 2 ppm to about 8 ppm or from about 2 to about 5 ppm or from about 2 to about 4 ppm or from about 2 to about 3 ppm or from about 2 to about 8 ppm or from about 3 to about 10 ppm or from about 4 to about 10 ppm or 5 to about 10 ppm, or from about 6 to about 10 ppm.

EXAMPLES

Example 1

Construction of the Cell

An electrochemical cell was assembled. The negative electrode was prepared from nano $Li_4Ti_5O_{12}$ and the positive electrode was prepared from $LiNi_{0.33}Co_{0.33}Mn_{0.33}O_2$. The negative electrode was prepared using the following steps: mixing the $Li_4Ti_5O_{12}$ with 5% carbon black and 5% PVDF binder dissolved in NMP solvent to form a slurry; the slurry was spread on aluminum foil and heated to evaporate the NMP solvent; the dry electrode was calendared and cut into a rectangular sample electrode having a 2" by 3" size of about 38 $cm^2$. The positive electrode was prepared with $LiNi_{0.33}Co_{0.33}Mn_{0.33}O_2$ using the same procedure described for preparation of the negative electrode. The two prepared electrodes were placed inside in a soft pack electrochemical cell with $EC:EMC/LiPF_6$ electrolyte.

Three consecutive pairs of formation steps were performed at 85° C., in which the first step of the pairwise steps was to keep the negative electrode at about 1.2V vs. lithium reference electrode, while during the second step of the pair of steps the positive electrode potential was kept at about 3.0 V vs. lithium reference electrode. The changes in the electrode potential during each step was performed at 1C the charge or the respectively discharge rate.

Example 2

Life Cycle Performance

Figure 2:
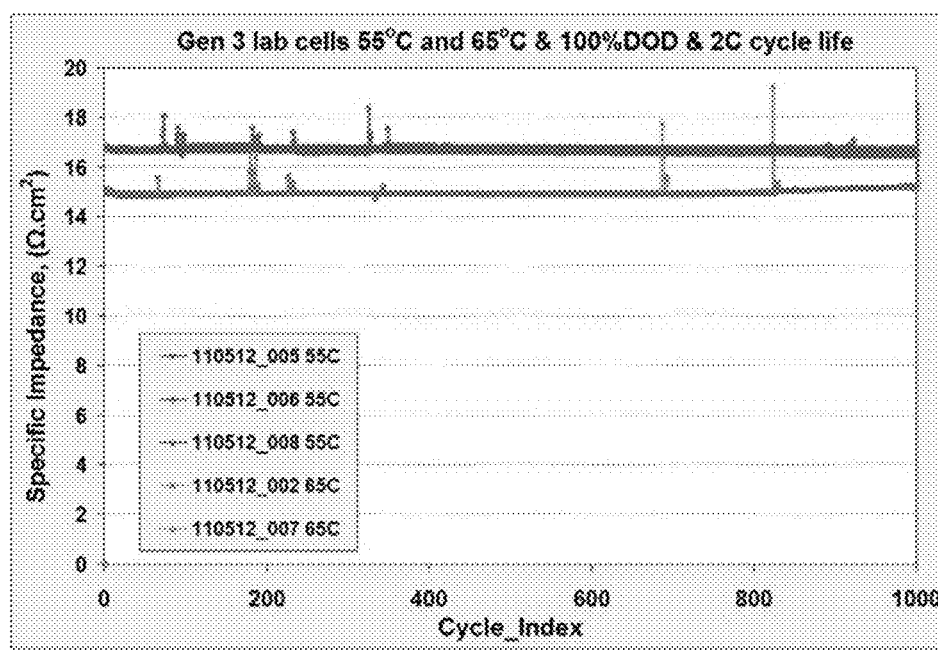
FIG. 2. Impedance retention during cycling at 2C/2C constant current charge/discharge rate and 100% DOD at 55° C. and 65° C. of $Li_4Ti_5O_{12}/LiNi_{0.33}Co_{0.33}Mn_{0.33}O_2$ cells.

Five cells with composition described in Example 1 were subjected to formation protocol described in Example 1. After the formation, three of the cells were subjected to 55° C. cycle life test and two of the cells were subjected to 65° C. cycle life test. The cycling tests were performed at 100% DOD and a constant current 2C charge and 2C discharge rates. The cell capacity measured during the cycling tests were normalized by the specific capacity of $Li_4Ti_5O_{12}$ electrode. The results of the cycling test are shown in FIG. 1. In spite of the high charge/discharge rate used for this test the specific capacity of the LTO electrode during this cycling is very close to the theoretical capacity of LTO of about 176 mAh/g. Furthermore, as illustrated in FIG. 1, the capacity fade of the cell during cycling at 55° C. and even 65° C. is negligible.

Example 3

Cell Impedence

During the described cycling test at example 2, the cell specific impedance was also calculated from the cell current and the cell polarization. The changes in the cell specific impedance during the cycling test were performed at 55° C. and 65° C. at 100% DOD and at constant current; 2C charge and 2C discharge rates are displayed in FIG. 2. The cell impedance have no significant change and is constant during 1000 cycles of the cycle life test in both 55° C. and 65° C.

Example 4

EIS Impedence

Figure 3:
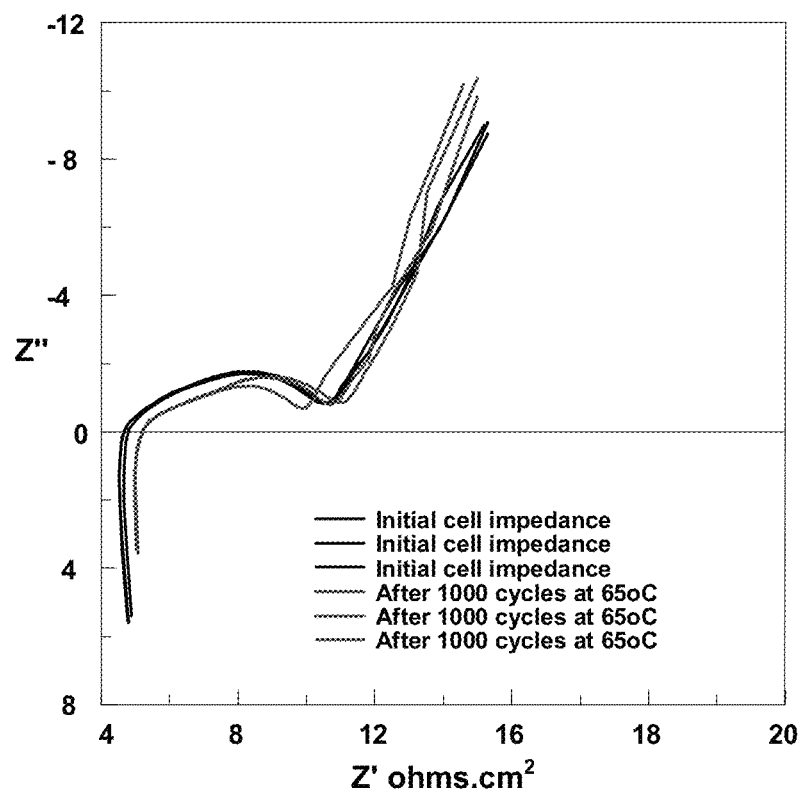
FIG. 3. EIS impedance before and after 1000 cycles at 65° C. of $Li_4Ti_5O_{12}/LiNi_{0.33}Co_{0.33}Mn_{0.33}O_2$ cells.

In addition to the specific impedance measurements described in Example 3, Electrochemical Impedance Spectroscopy (EIS) measurements were also performed on 3 cells with composition and formation protocol according Example 1, both before and after the 1000 cycles of 65° C. cycling performance test. The 65° C. cycle life test was performed using the same 100% DOD and 2C charge & 2C discharge rate cycle life test described in Example 2. The Electrochemical Impedance Spectroscopy measurement was performed at 25° C. in the frequency range from $10^3$ to $10^{-2}$ Hertz. FIG. 3 illustrates the cell EIS impedance of $Li_4Ti_5O_{12}$ $LiNi_{0.33}Co_{0.33}Mn_{0.33}O_2$ cells formed according to the invention and before and after 1000 cycles of cycle life test at 65° C. As shown in FIG. 3 there is no significant change in cells and in particular the large semicircles, which reflect the interface impedance of the positive electrode is decreased rather than increased.

Example 5

Moisture Content

An electrochemical cell using $Li_4Ti_5O_{12}$/and $LiNi_{0.33}Co_{0.33}Mn_{0.33}O_2$ electrodes was assembled using the same cell preparation procedure as described in Example 1. The total moisture content introduced from electrode materials in the electrolyte after cell assembling was 1670 ppm. The cells were formed according to the invention at 90° C. using a two hour step where the negative electrode was kept at 1.2 V vs lithium reference electrode for 2 hours, following by a step where the positive electrode was kept for another two hours at 3.0V vs lithium reference electrode. A third step where the negative electrode was kept again at 1.2V vs lithium reference electrode was performed for another two hours. The change of the potentials between each step was performed with a 6C rate. The moisture content in electrolyte was measured after the described formation by using the Karl Fisher method. The mean moisture content from three parallel tests was found to be only 3 ppm.

Example 6

Comparative Example with Standard Cell Formation

Figure 4:
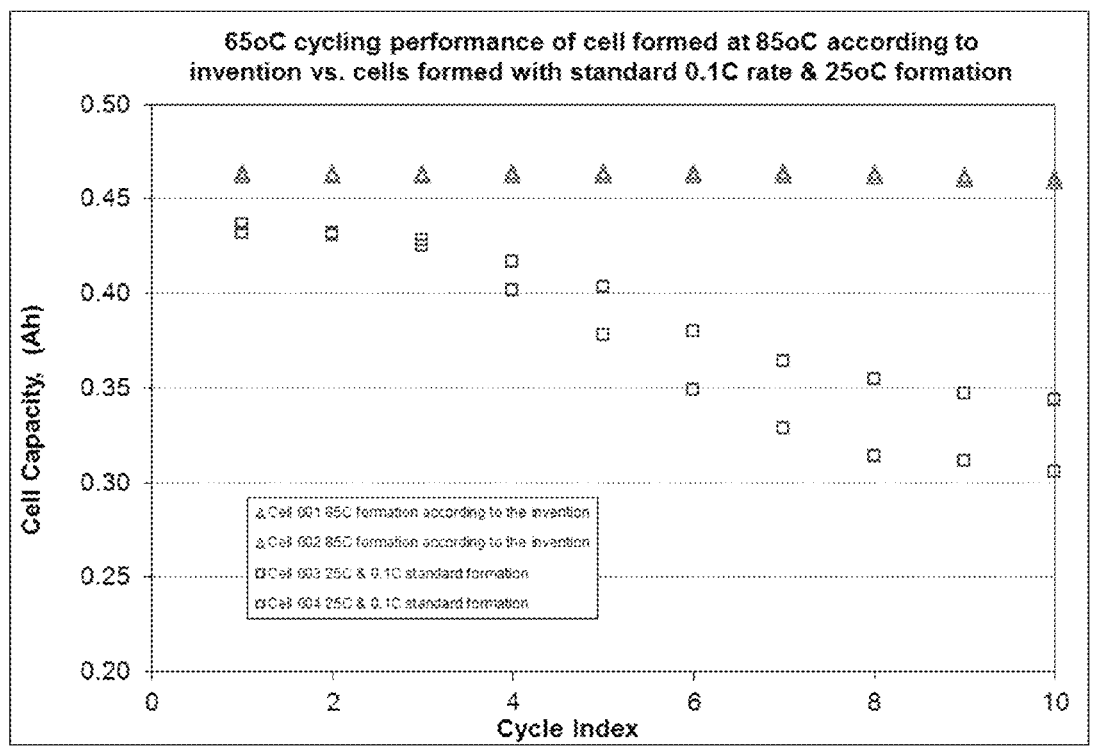
FIG. 4. 65° C. Cycling Performance of a cell formed the present invention using 85° C. when compared with that of a cell formed at 25° C. and at 0.1C.

Four electrochemical cells using $Li_4Ti_5O_{12}$/and $LiNi_{0.33}Co_{0.33}Mn_{0.33}O_2$ electrodes were assembled using the same cell preparation procedure as described in Example 1. Two of the cells were formed according to the present invention by using three consecutive pairs of formation steps at 85° C., in which the first step of the pairwise steps was to keep the negative electrode at about 1.2V vs. lithium reference electrode, while during the second step of the pair of steps the positive electrode potential was kept at about 3.0 V. Two other cells were formed using the typical formation procedure generally used for formation of lithium ion batteries, where the cell is formed with two consecutive cycles at 25° C. with lower charge/discharge rate of 0.1C. After the formation the cells were tested at 65° C. with 2C constant current charge and 2C constant current discharge rate. The results are shown in FIG. 4 which demonstrates that the cells according to the invention do not change their capacity during cycling at 65° C., while the reference cells formed with typical lithium ion battery formation protocol have about 5% lower capacity and lost another 20%-25% of their capacity during the first 10 cycles at 65° C.

Within this disclosure, any indication that a feature is optional is intended provide adequate support (e.g., under 35 U.S.C. 112 or Art. 83 and 84 of EPC) for claims that include closed or exclusive or negative language with reference to the optional feature. Exclusive language specifically excludes the particular recited feature from including any additional subject matter. For example, if it is indicated that A can be drug X, such language is intended to provide support for a claim that explicitly specifies that A consists of X alone, or that A does not include any other drugs besides X. "Negative" language explicitly excludes the optional feature itself from the scope of the claims. For example, if it is indicated that element A can include X, such language is intended to provide support for a claim that explicitly specifies that A does not include X. Non-limiting examples of exclusive or negative terms include "only," "solely," "consisting of," "consisting essentially of," "alone," "without", "in the absence of (e.g., other items of the same type, structure and/or function)" "excluding," "not including", "not", "cannot," or any combination and/or variation of such language.

Similarly, referents such as "a," "an," "said," or "the," are intended to support both single and/or plural occurrences unless the context indicates otherwise. For example "a dog" is intended to include support for one dog, no more than one dog, at least one dog, a plurality of dogs, etc. Non-limiting examples of qualifying terms that indicate singularity include "a single", "one," "alone", "only one," "not more than one", etc. Non-limiting examples of qualifying terms that indicate (potential or actual) plurality include "at least one," "one or more," "more than one," "two or more," "a multiplicity," "a plurality," "any combination of," "any permutation of," "any one or more of," etc. Claims or descriptions that include "or" between one or more members of a group are considered satisfied if one, more than one, or all of the group members are present in, employed in, or otherwise relevant to a given product or process unless indicated to the contrary or otherwise evident from the context.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While this invention has been particularly shown and described with references to example embodiments thereof, it will be understood by those skilled in the art that the various changes in form and details may be made therein without departing from the scope of the invention encompassed by the appended claims.

The invention claimed is:

1. A method of preparing a lithium ion battery cell comprising a negative electrode, a positive electrode and electrolyte solution comprising:
   a) adjusting the potential of the negative electrode such that hydrogen ions in electrolyte solution are reduced to hydrogen molecules;
   b) adjusting the potential of the positive electrode such that hydrogen ions in the positive electrode material are extracted; and
   c) degassing the lithium ion battery cell.

2. The method of claim 1 wherein the negative electrode is $Li_4Ti_5O_{12}$.

3. The method of claim 2 wherein the positive electrode is layered transition metal oxide or mixture of transition metal oxides where at least one of the component is layered transition metal oxide.

4. The method of claim 3 wherein steps a) and b) are performed from about 75° C. to about 110° C.

5. The method of claim 4 wherein steps a) and b) are performed for a duration from about 0.5 hours to about 5 hours.

6. The method of claim 5 wherein the negative electrode potential in step a) is between about 1.0V to about 2.0V versus that of a lithium reference electrode.

7. The method of claim 5 wherein the negative electrode potential in step a) is between about 1.2V to about 1.5V versus that of a lithium reference electrode.

8. The method of claim 5 wherein the negative electrode potential in step a) is between about 2.0V to about 3.5V versus that of a lithium reference electrode.

9. The method of claim 5 wherein the negative electrode potential in step a) is between about 3.5V to about 4.5V versus that of a lithium reference electrode.

10. The method of claim 5 wherein the positive electrode potential in step b) is between about 1.0V to about 2.0V versus that of a lithium reference electrode.

11. The method of claim 5 wherein the positive electrode potential in step b) is between about 2.6V to about 3.2V versus that of a lithium reference electrode.

12. The method of claim 5 wherein the change of the electrode potentials between step a) and step b) is performed using charge/discharge rate between 1C and 10C rate.

13. The method of claim 1 further comprising repeating steps a) and b) in sequential order before performing step c).

14. The method of claim 1 further comprising repeating steps a) and b) in sequential order two or more times before performing step c).

15. The method of claim 1 further comprising repeating step a) after step b) after which step c) is performed.

16. A method of preparing a lithium ion battery cell comprising a negative electrode, a positive electrode and electrolyte solution comprising:
   a) adjusting the potential of the negative electrode such that hydrogen ions in electrolyte solution are reduced to hydrogen molecules;
   b) adjusting the potential of the positive electrode such that hydrogen ions in the positive electrode material are extracted;
   c) adjusting the potential of the negative electrode such that hydrogen ions in electrolyte solution are reduced to hydrogen molecules;
   d) degassing the lithium ion battery cell.

17. The method of claim 1 wherein the water content in the electrolyte is reduced by from about 10% to about 99%.

18. The method of claim 1 wherein the water content in the electrolyte is reduced to about 1 ppm to about 10 ppm.

* * * * *